No. 621,602. Patented Mar. 21, 1899.
H. F. EAKLE.
SEED SEPARATOR.
(Application filed Feb. 28, 1898.)
(No Model.)
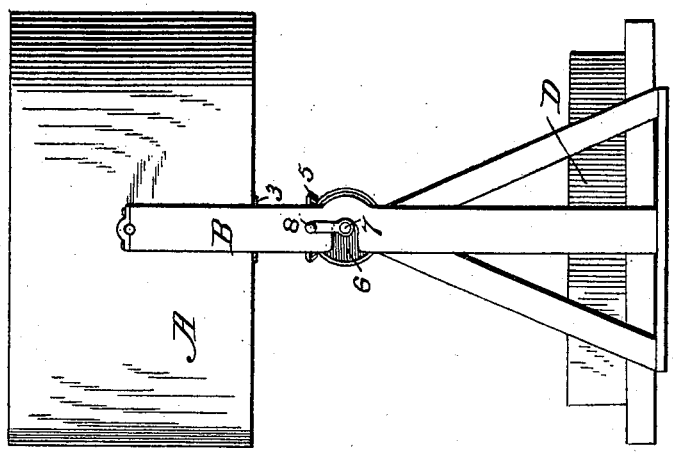
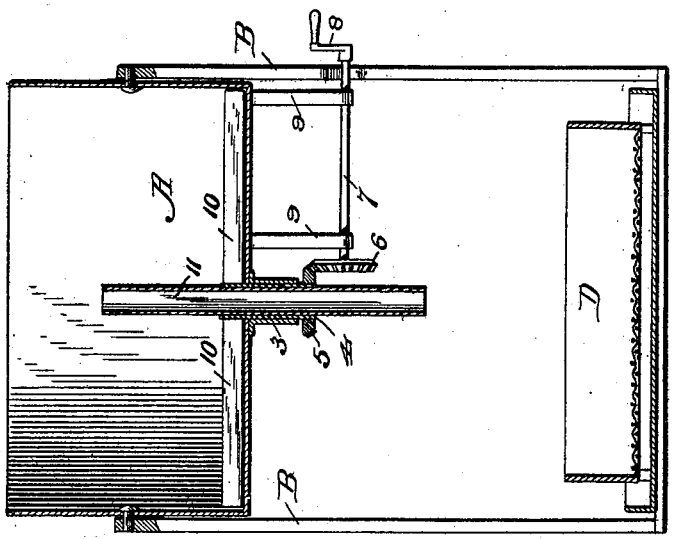
Attest
Inventor
Henry F. Eakle

UNITED STATES PATENT OFFICE.

HENRY F. EAKLE, OF NEW HOPE, VIRGINIA.

SEED-SEPARATOR.

SPECIFICATION forming part of Letters Patent No. 621,602, dated March 21, 1899.

Application filed February 28, 1898. Serial No. 671,990. (No model.)

*To all whom it may concern:*

Be it known that I, HENRY F. EAKLE, a citizen of the United States, residing at New Hope, in the county of Augusta and State of Virginia, have invented certain new and useful Improvements in Seed-Separators, of which the following is a specification.

My invention hereinafter described relates to the separation of the seeds of the common plantain from clover-seed, the former being the seed of a noxious plant and frequently mixed with the seeds of the clover and not separable therefrom by any mechanical means known to me.

My invention consists principally of a process or method of operation which may be carried on by simple and ordinary apparatus, but for which I have devised an apparatus which is effective and inexpensive and in which my invention in part consists.

The seed of the common plantain have a peculiar quality in this respect that when wet they throw out adhesive filaments, and while not light enough to float upon the surface of water they are yet lighter when wet than the seed of the clover. My new process therefore consists in placing the clover-seed in which plantain-seeds have become mixed in a suitable vessel containing water and with the seed thereby wet separating them by agitation. Preferably I effect the separation by rotary movement of the mass of seeds. This causes the plantain-seed to gather upon the surface of the mass of clover-seed and to slightly cohere by reason of the sticky filaments. After the separation above described has taken place the slightly-coherent mass of plantain-seed is drawn off through a suitable tube at the center of the vessel, said tube being adjusted to meet the level of the mass of the plantain-seed. This process will take off all the plantain-seeds excepting such as have attached themselves to the seeds of the clover. Seeds so attached are heavy and will not separate from the mass of clover-seed. These attached seed remain, therefore, with the mass of clover-seed and are dried therewith. Then the seeds of the clover which have stuck to the plantain are firmly held to the dried seeds and are easily separated therefrom by means of any suitable sieve which will permit the separate seeds of the clover to pass through the meshes, but will retain those plantain-seeds which have clover-seeds adhering thereto.

The apparatus designed to facilitate the above-described process is shown in the accompanying drawings, in which—

Figure 1 shows the apparatus partly in side elevation and partly in section. Fig. 2 shows the apparatus also in side elevation, but one-quarter turned from the position shown in Fig. 1.

In the drawings the cylindrical tub is shown at A. It is mounted by means of trunnions on vertical standards B, which are supported upon a suitable frame and base, as shown in the drawings. The mounting is such that the tub may be tipped for discharge of its contents. On the bottom of the tub is fixed an axial sleeve 3, in which is closely fitted another sleeve 4, adapted to turn, but sufficiently close or provided with any suitable stuffing-box, so that the water may not escape from the tub during the operation. On the end of this sleeve 4, projecting within the box, are fixed horizontal arms 10, which lie near the bottom and extend near the sides. To the lower end of sleeve 4, projecting below the sleeve 3, is fixed a bevel-gear 5, which engages another bevel-gear 6 on the end of a horizontal shaft 7, having its bearings in hangers 9 9 and having also a crank 8, whereby it may be turned to rotate the arms and cause the contents of the tub to rotate therein.

Within the sleeve 4 is a tube 11, fitted snugly so as to prevent leaking and to give sufficient frictional contact to hold the tube and yet permit it to be adjusted vertically. Below the tub is a box D, preferably with a screen or perforated bottom. It is arranged to receive the discharge from the tube 11.

In using my process by means of the apparatus above described I place in the tub a convenient amount of water and a mass of the clover-seed from which the plaintain-seed is to be eliminated. The water must be in such relative quantity that it will stand above the surface of the seed. I then agitate the mass of seed by causing the rotation of the arms 10 10, which causes to revolve the mingled mass of seed and water. The plantain-seed become saturated, and the filaments adhering thereto become loosened. Also these seeds move outward by centrifugal force of rotation and from their moistened condition rise to the surface of the mass of seed. When this separation of the two kinds of seed has been accomplished, I adjust the tube 11 vertically, so as to bring its upper end below the horizontal level of the stratum of plantain-seed. On the cessation of rotation of the arms the discharge which takes place through the central tube causes the plantain-seed to move to the center and run down through the tube onto the screen below, so that it may all, or substantially all, be drawn off and separated from the mass of clover-seed. Some small percentage of the clover-seed may also be drawn off, and some of the plantain may be retained, as above described; but that plantain which remains is only that which has adhered to clover, and these adhering seeds may, after the drying of the clover-seed, be sifted out without difficulty.

While I have shown a suitable machine and one which may be furnished to the farmer for domestic use, it will be obvious that other apparatus may be used for the same purpose.

The standard B on one side is cut away, so as to admit the shaft and allow the tub, with rotating mechanism, to tip for emptying.

I claim—

1. The hereinbefore-described method of separating clover-seed from plantain-seed, consisting in agitating the mass of mingled seed in water, whereby the plantain-seed is caused to soften and become sticky, and to separate from the clover-seed, and then drawing off the said plantain-seed.

2. The tub combined with the means for agitating the mass of seed consisting of arms placed therein, means for operating the arms, and an adjustable draining-tube, said arms rotating about the adjustable tube all substantially as described.

3. In combination, the tub, the agitating-arms, the hollow sleeve, with gearing for moving the same, connected to the agitating-arms, and the discharge-tube adjustable vertically through the hollow sleeve, substantially as described.

In testimony whereof I affix my signature in presence of two witnesses.

HENRY F. EAKLE.

Witnesses:
HENRY E. COOPER,
L. B. MIDDLETON.